(12) United States Patent
Shimano et al.

(10) Patent No.: US 7,853,082 B2
(45) Date of Patent: Dec. 14, 2010

(54) NORMAL LINE INFORMATION ESTIMATION DEVICE, REGISTERED IMAGE GROUP FORMATION DEVICE AND IMAGE COLLATION DEVICE, AND NORMAL LINE INFORMATION ESTIMATION METHOD

(75) Inventors: Mihoko Shimano, Tokyo (JP); Kenji Nagao, Kanagawa (JP); Etsuko Nagao, legal representative, Kanagawa (JP)

(73) Assignee: Panasonic Corporation, Osaka (JP)

( * ) Notice: Subject to any disclaimer, the term of this patent is extended or adjusted under 35 U.S.C. 154(b) by 889 days.

(21) Appl. No.: 11/577,919

(22) PCT Filed: Nov. 4, 2005

(86) PCT No.: PCT/JP2005/020271

§ 371 (c)(1),
(2), (4) Date: Apr. 25, 2007

(87) PCT Pub. No.: WO2006/049237

PCT Pub. Date: May 11, 2006

(65) Prior Publication Data
US 2009/0208108 A1 Aug. 20, 2009

(30) Foreign Application Priority Data
Nov. 8, 2004 (JP) .............................. 2004-323389

(51) Int. Cl.
*G06K 9/62* (2006.01)
*G06K 9/46* (2006.01)
*G06T 7/00* (2006.01)
(52) U.S. Cl. ........................ 382/190; 382/218; 382/286; 382/118
(58) Field of Classification Search ................. 382/118, 382/181, 209, 217, 218, 190, 286, 276, 274
See application file for complete search history.

(56) References Cited

U.S. PATENT DOCUMENTS 6,714,665 B1* 3/2004 Hanna et al. ................. 382/117

(Continued)

FOREIGN PATENT DOCUMENTS

JP 2001-283224 10/2001

(Continued)

OTHER PUBLICATIONS

T. Sim, T. Kanade, "Combining Models and Exemplars for Face Recognition: An Illuminating Example", In Proceedings of Workshop on Models versus Examplars in Computer Vision, CVPR 2001, Robotics Insitute, Carnegie Mellon Univ., Pittsburgh, PA.

(Continued)

*Primary Examiner*—Jon Chang
(74) *Attorney, Agent, or Firm*—RatnerPrestia

(57) ABSTRACT

A normal line information estimation device for estimating normal line information of an object from an image of the object. The normal line information estimation device includes an illumination direction estimation section for estimating an illumination direction with respect to the object in the image from a luminance value of the image; a normal line information estimation section for estimating the normal line information of the object in the image based on the illumination direction; and a specular reflection component estimation section for estimating a specular reflection component of the image from the normal line information of the object and the illumination direction with respect to the object. The normal line information estimation section estimates the normal line information again from the image from which a specular reflection component has been removed in the specular reflection component section.

8 Claims, 9 Drawing Sheets

U.S. PATENT DOCUMENTS

| | | | |
|---|---|---|---|
| 6,980,697 B1 * | 12/2005 | Basso et al. | 382/274 |
| 7,058,217 B2 * | 6/2006 | Thornber et al. | 382/154 |
| 2001/0031073 A1 * | 10/2001 | Tajima | 382/118 |
| 2002/0150306 A1 * | 10/2002 | Baron | 382/275 |

FOREIGN PATENT DOCUMENTS

| | | |
|---|---|---|
| JP | 2002-04830 | 1/2002 |
| JP | 2002-024830 | 1/2002 |
| JP | 2004-086929 | 3/2004 |

OTHER PUBLICATIONS

International Search Report for corresponding International PCT Application No. PCT/JP2005/020271 dated Dec. 13, 2005.

\* cited by examiner

20

25

50 Image collation device

NORMAL LINE INFORMATION ESTIMATION DEVICE, REGISTERED IMAGE GROUP FORMATION DEVICE AND IMAGE COLLATION DEVICE, AND NORMAL LINE INFORMATION ESTIMATION METHOD

This application is a U.S. National Phase Application of PCT International Application No. PCT/JP2005/020271 filed Nov. 4, 2005.

TECHNICAL FIELD

The present invention relates to an image collation device for comparing and collating an input two-dimensional image with a previously registered two-dimensional image. In particular, it relates to a normal line information estimation device, a registered image group formation device and an image collation device, which are used in image collation, and a normal line information estimation method.

BACKGROUND ART

Conventionally, an image collation device for comparing and collating an input two-dimensional image with a previously recorded two-dimensional image has been practically used. In particular, various image collation devices for realizing a face authentication method that is one of the authentication methods using biometrics have been proposed. In image collation devices for realizing a face authentication method, face images of a plurality of persons who can be authenticated (hereinafter, referred to as "registered persons") are previously registered in a database as registered face images. A face image of a person who is to be provided with authentication (hereinafter, referred to as "a person to be authenticated") and a registered face image are compared and collated with each other. As a result, when it is determined that the face image of the person to be authenticated matches or resembles a registered face image of a certain registered person, the person to be authenticated is authenticated as the certain registered person.

In such an image collation device, due to differences in various photographing conditions between a face image of a person to be authenticated and a registered face image, the authentication rate may be reduced.

For example, when a direction in which light is illuminated to a face image of a person to be authenticated (hereinafter, this direction is referred to as an "illumination direction") is different from an illumination direction of an object in the registered face image, even if the images are those of the same objects, as a result of comparison and collation, it may be determined that they do not match each other.

In order to solve these problems, various techniques have been proposed. For example, as to each of the registered persons, from one registered face image, an illumination direction at the photographing time and a face shape (normal vector (normal line vector)), and the like, are estimated. By using these conditions, a plurality of images in a plurality of different illumination directions (hereinafter, referred to as a "registered face image group") are formed and registered in a database, and then at the time of authentication, a face image of an object is compared and collated with all the registered face image groups that have been registered in a database, thereby improving the authentication rate (see, for example, T. Sim, T. Kanade, "Combining Models and Exemplars for Face Recognition: An Illuminating Example," Proc. CVPR Workshop on Models versus Exemplars in Computer Vision, 2001).

However, in the above-mentioned conventional technique, when an illumination direction in an image is estimated, the illumination direction is estimated assuming that all the reflection in the face is diffused reflection. Actually, however, since not all the reflection in a face is diffuse reflection, the directions of the normal vectors of the face may not be correctly estimated. Therefore, there is a problem that the formed registered face image group does not necessarily match an image actually photographed in a predetermined illumination direction. Even if authentication processing is carried out later, the authentication rate is not improved.

SUMMARY OF THE INVENTION

In view of the foregoing problems, the present invention has been made. The present invention provides an image collation device capable of forming a registered face image group that matches an actual image and having a high authentication rate.

In order to solve such problems, a normal line information estimation device of the present invention estimates normal line information of an object from an image of the object and includes an illumination direction estimation section for estimating an illumination direction with respect to the object in the image from a luminance value of the image; a normal line information estimation section for estimating the normal line information of the object in the image based on the illumination direction; a specular reflection component estimation section for estimating a specular reflection component of the image from the normal line information of the object and the illumination direction with respect to the object; and a specular reflection component removing section for removing the specular reflection component from the image. The normal line information estimation section estimates normal line information again from the image from which the specular reflection component has been removed in the specular reflection component section. Note here that the estimation of the normal line information means estimating a normal line direction or information including a normal line direction (for example, information such as reflectance).

With such a configuration, since normal line estimation is carried out from an image from which a specular reflection component due to the effect of reflection of a light source has been removed, when this normal line information estimation device is used, the adverse effect such as reflection of a light source caused by, for example, glaze on the face can be removed. Consequently, it is possible to estimate normal line information for forming a registered image group that matches actual images. By using this, it is possible to provide an image collation device having a high authentication rate.

Furthermore, the normal line information estimation device may further include a convergence determination section for comparing a value of the normal line information estimated in the normal line information estimation section before the specular reflection component is removed with a value of the normal line information estimated in the normal line information estimation section after the specular reflection component is removed, and determining whether the values of the normal line information converge. In this configuration, the value of the normal line information, which has been determined to converge in the convergence determination section, is output.

With such a configuration, furthermore, since a value of the normal line information, which has been determined to converge, is output, more accurate calculation of the normal line information can be carried out.

Furthermore, the illumination direction estimation section may estimate the illumination direction of the object again from the image from which the specular reflection component has been removed in the specular reflection component removing section, and the normal line information estimation section may estimate normal line information again from the image from which the specular reflection component has been removed by using the illumination direction estimated again in the illumination direction estimation section.

With such a configuration, furthermore, since the illumination direction is estimated again from the image from which a specular reflection component has been removed and normal line information is estimated again by using the resultant illumination direction, it is possible to estimate realistic normal line information.

Furthermore, the registered image group formation device of the present invention includes a normal line information estimation device of the present invention; a registered image input section for inputting a registered image to be registered into the normal line information estimation device; an illumination direction input section to which a plurality of different illumination directions are input; a specular reflection component calculation section for calculating a specular reflection component of the object in the plurality of different illumination directions based on the normal line information with respect to the registered image output from the normal line information estimation device; a diffuse reflection component calculation section for calculating a diffuse reflection component of the object in the plurality of different illumination directions based on the normal line information corresponding to the registered image output from the normal line information estimation device; and an image synthesizing section for forming a registered image group in the plurality of different illumination directions by adding the specular reflection component and the diffuse reflection component.

With such a configuration, since normal line estimation is carried out from the image from which a specular reflection component has been removed, it is possible to remove an adverse effect such as reflection and to form a registered image group that matches actual images. Thus, by using this, an image collation device having a high authentication rate can be provided.

Next, the image collation device of the present invention includes a registered image group formation device of the present invention; a registered image group storing section for storing a registered image group formed in the registered image group formation device; a comparative image input section for inputting a comparative image to be compared; a comparison and collation section for comparing and collating the comparative image input from the comparative image input section with the registered image group stored in the registered image group storing section.

With such a configuration, since normal line estimation is carried out from the image from which a specular reflection component has been removed, it is possible to remove an adverse effect such as reflection and to form a registered image group that matches actual images. Thus, an image collation device having a high authentication rate can be provided.

Furthermore, the image collation device may include a comparative image illumination direction estimation section for estimating an illumination direction in the comparative image input by the comparative image input section; and an image retrieving section for retrieving a registered image in the illumination direction estimated in the comparative image illumination direction estimation section from the registered image group storing section. In the configuration, the comparison and collation section may collate the registered image retrieved by the image retrieving section with the comparative image.

With such a configuration, furthermore, comparison and collation can be carried out by estimating the illumination direction from the comparative image and retrieving the registered image corresponding to the estimated illumination direction from the registered image group stored in the registered image group storing section. Thus, it is possible to realize a configuration suitable for a small device capable of reducing the number of times of comparing and collating processing and capable of reducing operation load to CPU and the like.

Furthermore, the image collation device may include a first feature amount calculation section for calculating a feature amount of the registered image group formed in the registered image group formation device; and a second feature amount calculation section for calculating a feature amount of the comparative image input by the comparative image input section. In the configuration, the registered image group storing section stores the feature amount of the registered image group, and the comparison and collation section compares and collates the registered image group with the comparative image in terms of the feature amount.

With such a configuration, since data of the feature amount calculated by the feature amount calculation section are stored in the registered image group storing section, as compared with a configuration storing the image information itself of the registered image group, necessary storing capacity can be reduced. At the same time, since the comparing and collating section carries out comparison and collation by using feature amounts respectively output from the registered image group storing section and the feature amount calculation section, as compared with a configuration carrying out matching with respect to the entire image, it is possible to realize a configuration suitable for a small device capable of reducing operation processing in the comparison and collating section and reducing operation load to CPU.

Next, the normal line information estimation method of the present invention estimates normal line information of an object from an image of the object. The method includes step (i) of estimating an illumination direction with respect to the object in the image from a luminance value of the image; step (ii) of estimating normal line information of the object in the image based on the illumination direction; step (iii) of estimating a specular reflection component of the image from the normal line information of the object and the illumination direction with respect to the object; step (iv) of removing the specular reflection component from the image; and step (v) of estimating normal line information again from the image from which the specular reflection component has been removed in step (iv).

With such a method, normal line estimation is carried out from the image from which the specular reflection component has been removed. Therefore, by using this normal line information estimation method, an adverse effect such as reflection of a light source caused by glaze of the face can be removed, and thus realistic normal line information estimation can be carried out.

Next, a program of the present invention estimates normal line information of an object from an image of the object. The program enables a computer to execute step (i) of estimating an illumination direction with respect to the object in the image from a luminance value of the image; step (ii) of estimating normal line information of the object in the image based on the illumination direction; step (iii) of estimating a specular reflection component of the image from the normal line information of the object and the illumination direction with respect to the object; step (iv) of removing the specular reflection component from the image; and step (v) of estimating normal line information again from the image from which the specular reflection component has been removed in step (iv).

With such a program, normal line estimation is carried out from the image from which the specular reflection component has been removed. Therefore, by using this program, an adverse effect such as reflection of a light source caused by glaze of the face can be removed, and thus realistic normal line information estimation can be carried out.

As mentioned above, the present invention provides an image collation device capable of forming a registered image group that matches actual images and having a high authentication rate.

Figure 1:
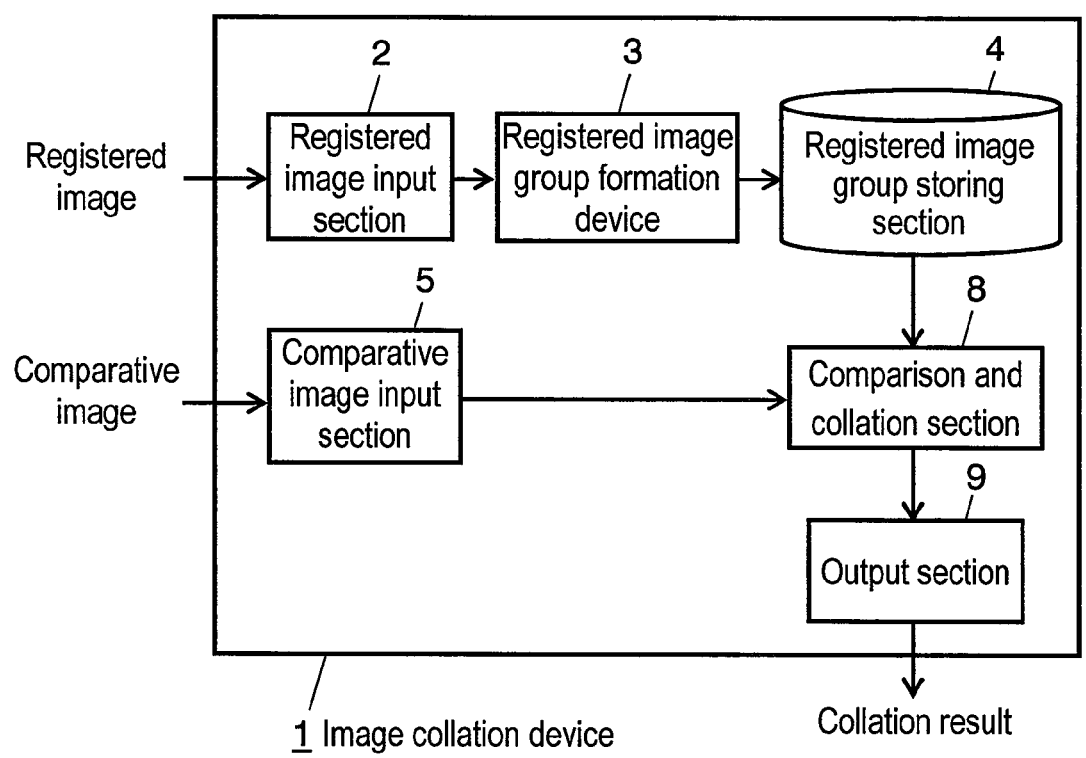
FIG. 1 is a block diagram showing a configuration of an image collation device in accordance with a first exemplary embodiment of the present invention.

REFERENCE MARKS IN THE DRAWINGS 1, 40, 50 image collation device
2 registered image input section
3 registered image group formation device
4 registered image group storing section
5 comparative image input section
6 illumination direction estimation section
7 image retrieving section
8, 33 comparison and collation section
9 output section
20, 26 registered image
25 comparative image
30 registered image group
31, 32 feature amount calculation section
34 feature amount storing section
41 illumination direction estimation section
42 normal line information estimation device
43 reflection component information calculation section
44 illumination direction input section
45 image synthesizing section
52 normal line information estimation section
53 specular reflection component estimation section
54 specular reflection component removing section
55 convergence determination section
61 specular reflection component calculation section
62 diffuse reflection component calculation section

DETAILED DESCRIPTION OF THE PREFERRED EMBODIMENT

Hereinafter, the exemplary embodiments of the present invention are described with reference to drawings.

First Exemplary Embodiment

Firstly, an image collation device in accordance with the first exemplary embodiment of the present invention is described. FIG. 1 is a block diagram showing a configuration of image collation device 1 in accordance with the first exemplary embodiment of the present invention.

As shown in FIG. 1, image collation device 1 in accordance with the first exemplary embodiment of the present invention includes registered image input section 2 to which registered image 20 (see FIG. 5) of a registered person is input, registered image group formation device 3 for forming a registered image group in a plurality of illumination directions by the below mentioned method from registered image 20 input by registered image input section 2, registered image group storing section 4 for storing the registered image group formed by registered image group formation device 3, comparative image input section 5 to which a face image of a person to be authenticated (hereinafter, referred to as "comparative image") is input, comparison and collation section 8 for comparing and collating a comparative image input from comparative image input section 5 with the registered image group stored in registered image group storing section 4, and output section 9 for outputting information such as comparison and collation results in comparison and collation section 8.

Registered image input section 2 and comparative image input section 5 may be configured so that images are input from a well-known storage medium. They may be configured by using a well-known reader such as a scanner, and may be configured so that images photographed by a camera, and the like, are input. Furthermore, image collation device 1 in accordance with the first exemplary embodiment of the present invention is not limited to a configuration in which registered image input section 2 and comparative image input section 5 are provided individually but may be a configuration in which registered image input section 2 and comparative image input section 5 share a single input means.

In each component of registered image group formation device 3 and comparison and collation section 8, the below-mentioned functions may be accomplished by software or may be accomplished by hardware such as a dedicated circuit.

Registered image group storing section 4 may use any recording medium selected from well-known recording media such as HDD, a semiconductor memory, and the like.

Output section 9 may be configured so that a signal from comparison and collation section 8, which shows whether collation can be carried out or not, is output as it is. Alternatively, it may be a configuration in which a person to be authenticated is informed of the collation results by video or audio data.

As a function of comparison and collation section 8, a well-known image comparison and collation method such as an eigenspace method, a subspace method, a KNN method, or the like, may be used.

Figure 2:
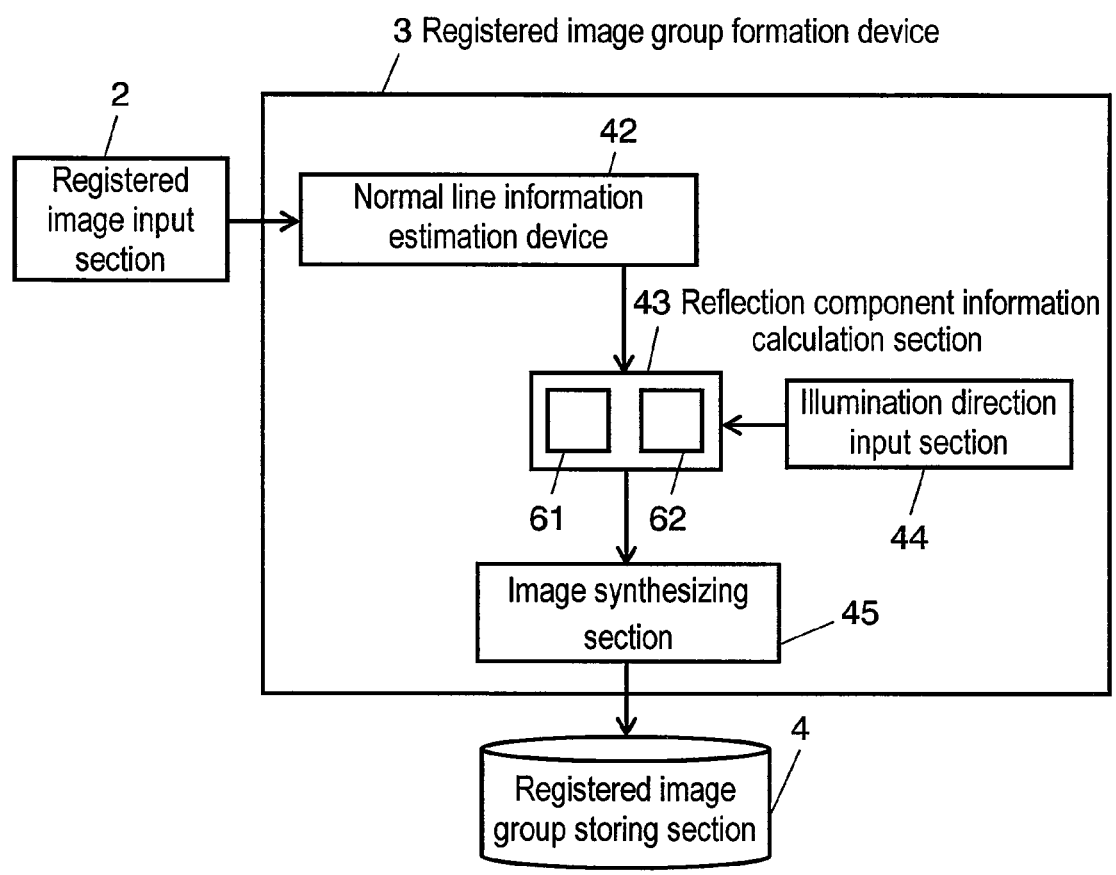
FIG. 2 is a block diagram showing a configuration of a registered image group formation device in accordance with a first exemplary embodiment of the present invention.

Herein, a configuration and function of registered image group formation device 3 in accordance with the first exemplary embodiment of the present invention is described in detail. FIG. 2 is a block diagram showing a configuration of registered image group formation device 3 in accordance with the first exemplary embodiment of the present invention.

As shown in FIG. 2, to registered image group formation device 3 in accordance with the first exemplary embodiment of the present invention, registered image 20 is input from registered image input section 2. Registered image group formation device 3 includes normal line information estimation device 42 for estimating normal line information including a normal line albedo vector of an object from the input registered image 20, illumination direction input section 44 to which a plurality of illumination directions for forming a registered image group are input, reflection component information calculation section 43 for calculating a specular reflection (mirror reflection) component and a diffuse reflection component of an object in the plurality of illumination directions input into illumination direction input section 44 by using the normal line information estimated by normal line information estimation device 42, and image processing section 45 for carrying out synthesizing processing of the registered image group based on the reflection component information calculated in reflection component information calculation section 43. Reflection component information calculation section 43 includes specular reflection component calculation section 61 for calculating a specular reflection (mirror reflection) component and diffuse reflection component calculation section 62 for calculating a diffuse reflection component.

Figure 3:
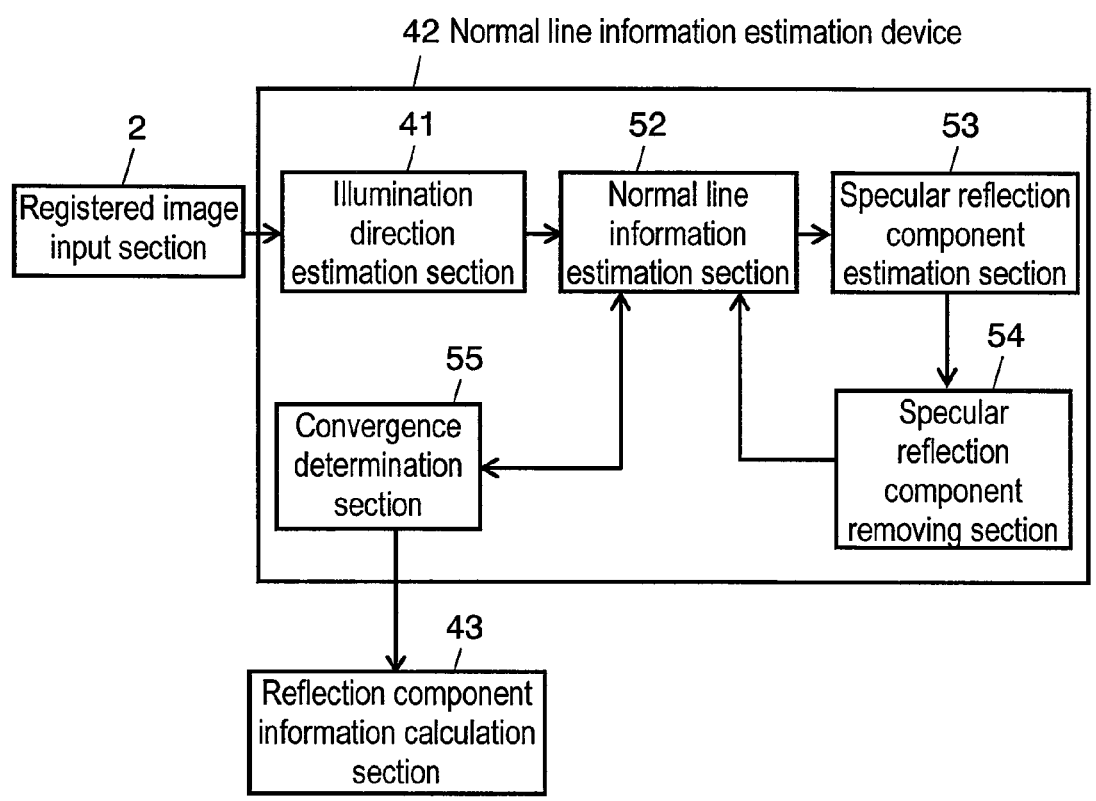
FIG. 3 is a block diagram showing a configuration of a normal line information estimation device in accordance with the first exemplary embodiment of the present invention.

Furthermore, a configuration and function of normal line information estimation device 42 in accordance with the first exemplary embodiment of the present invention is described in detail. FIG. 3 is a block diagram showing a configuration of normal line information estimation device 42 in accordance with the first exemplary embodiment of the present invention.

As shown in FIG. 3, to normal line information estimation device 42 in accordance with the first exemplary embodiment of the present invention, registered image 20 is input from registered image input section 2. Normal line information estimation device 42 includes illumination direction estimation section 41 for estimating the illumination direction from the input registered image 20, normal line information estimation section 52 for estimating normal line information of an object in registered image 20 from the illumination direction estimated in illumination direction estimation section 41 and a gray value of registered image 20, specular reflection component estimation section 53 for estimating a specular reflection component in the gray value of registered image 20 from the normal line information estimated in normal line information estimation section 52 and the illumination direction estimated by illumination direction estimation section 41, specular reflection component removing section 54 for removing specular reflection component estimated by specular reflection component estimation section 53 from the gray value of registered image 20, and convergence determination section 55 for determining whether or not the value of normal line information estimated in normal line information estimation section 52 converge.

Normal line information estimation section 52 estimates normal line information again from an image from which the specular reflection component has been removed by specular reflection component removing section 54. Convergence determination section 55 compares the normal line information estimated from the image from which the specular reflection component has been removed with the normal line information estimated from the image before the specular reflection component is removed so as to obtain the difference therebetween, determines that the normal line information converges when the difference is smaller than a predetermined value, and outputs the normal line information estimated from the image from which the specular reflection component has been removed or the normal line information estimated from image before the specular reflection component is removed (either value may be output because the values converge). The present invention is not limited to the above-mentioned configuration in which normal line information estimation section 52 estimates the normal line information from the images before and after the specular reflection component is removed. Two normal line information estimation sections can be used, that is, a first normal line information estimation section for estimating normal line information from the image before a specular reflection component has been removed and a second normal line information estimation section for estimating normal line information from the image after the specular reflection component has been removed can be used. In this case, convergence determination section 55 determines convergence by comparing the normal line information calculated in the first normal line information estimation section with the normal line information calculated in the second normal line information estimation section.

Figure 4:
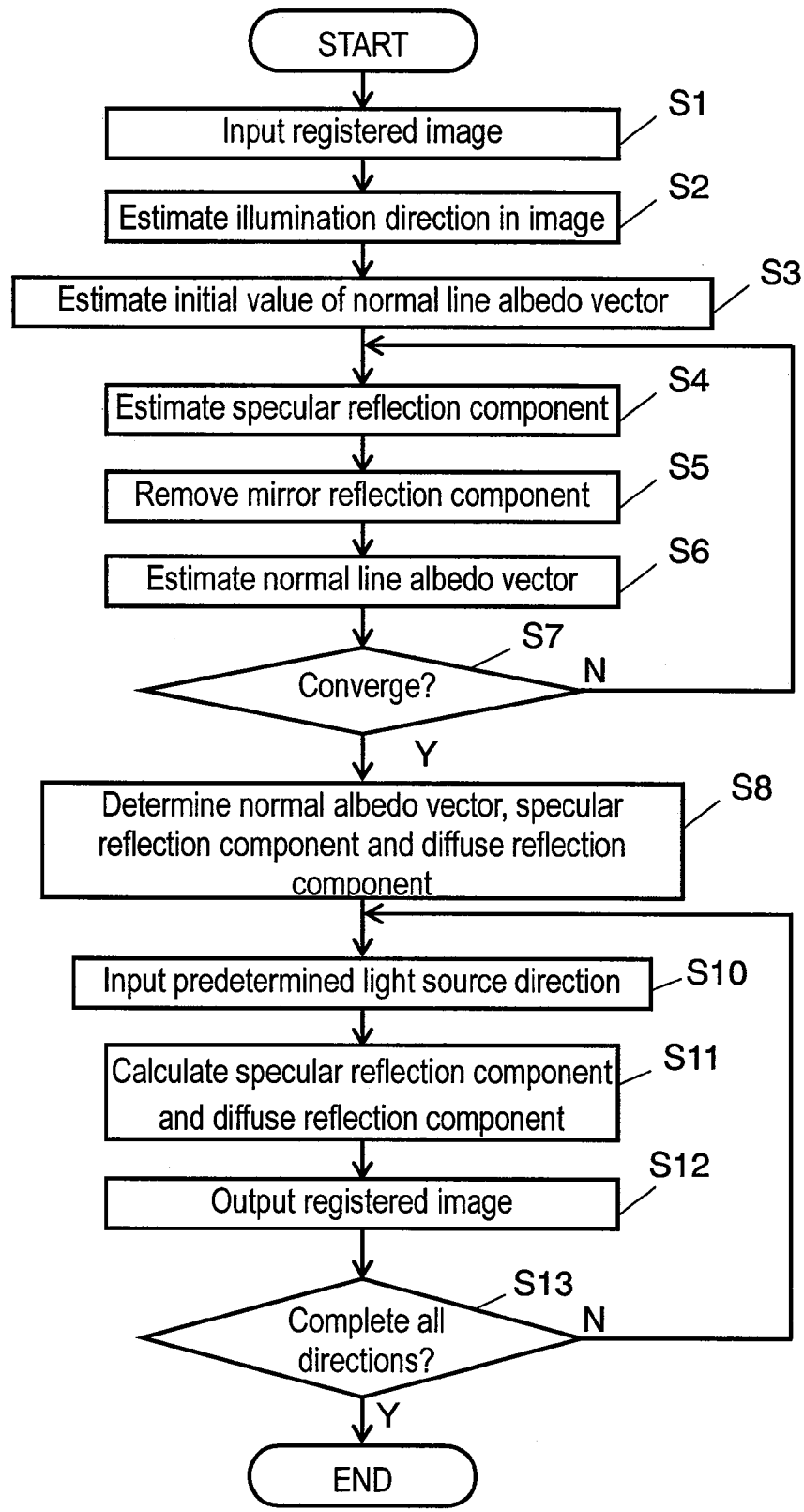
FIG. 4 is a flowchart showing an operation of the registered image group formation device of the image collation device in accordance with the first exemplary embodiment of the present invention.

Herein, an operation of image collation device 1 in accordance with the first exemplary embodiment of the present invention is described. FIG. 4 is a flowchart showing an operation step of registered image group formation device 3 of image collation device 1 in accordance with the first exemplary embodiment of the present invention. Note here that the function of each component of registered image group formation device 3 and image collation section 8 may be realized by hardware or software. When these functions are intended to be realized by software, each processing from step S1 to step S13 in FIG. 4 is described in software and allowed a computer to execute the processing.

As shown in FIG. 4, firstly, registered image 20 is input from registered image input section 2 to registered image group formation device 3 (S1).

Figure 5:
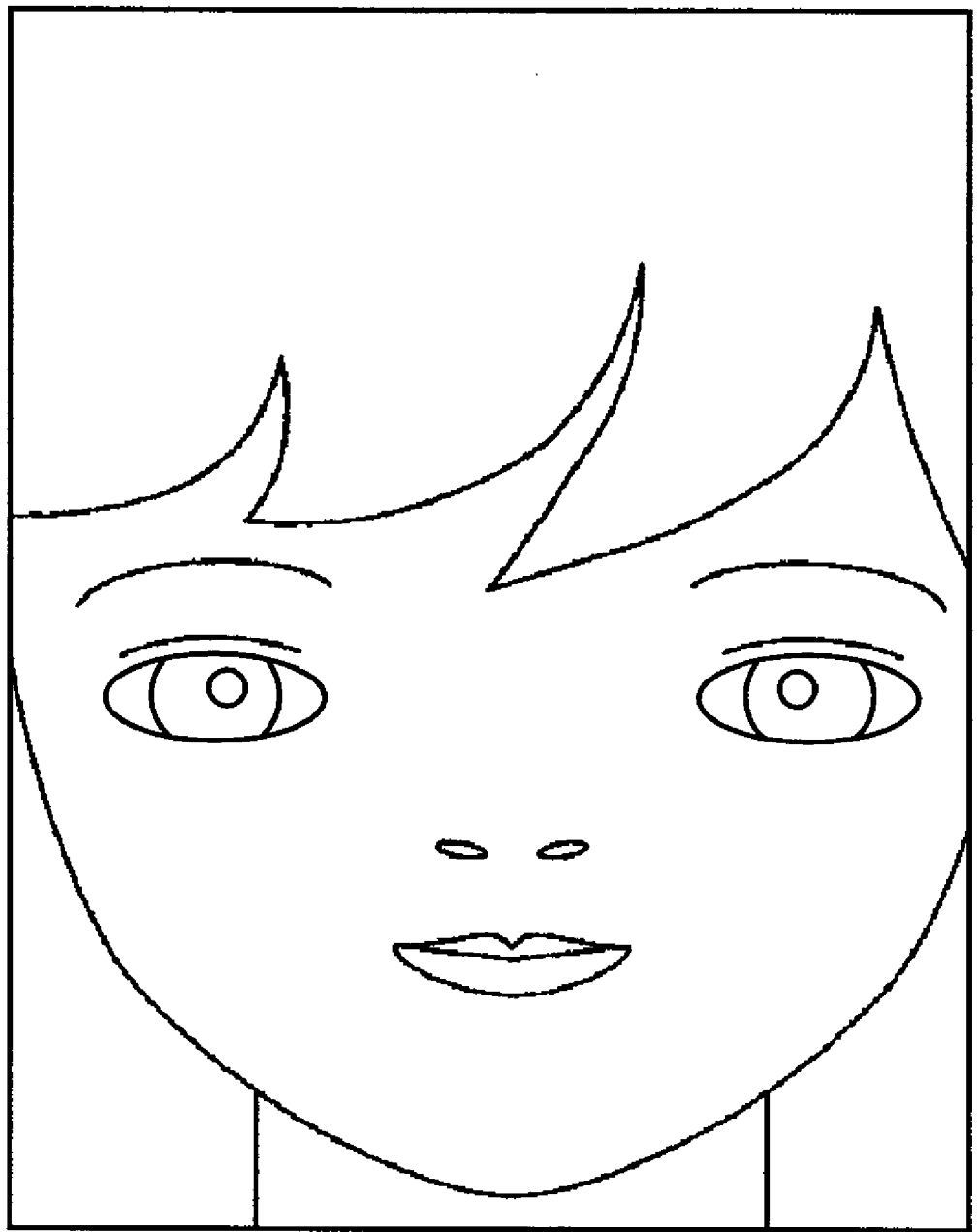
FIG. 5 conceptually shows an example of a registered image in accordance with the first exemplary embodiment of the present invention.

Herein, registered image 20 is one face image of a person to be registered. FIG. 5 conceptually shows an example of registered image 20 in accordance with the first exemplary embodiment of the present invention. Actually, as registered image 20, a shaded image having 10800 pixels in total (120 pixels in length and 90 pixels in width) is used.

Registered image 20 is transmitted to normal line information estimation device 42 of registered image group formation device 3 and illumination direction estimation section 41 of normal line information estimation device 42 estimates the illumination direction of one registered image 20 at the photographing time (S2). The illumination direction of registered image 20 can be estimated by a simple kernel regression expressed in the following equation. In the equation, each of J pieces of illumination patterns in a learning image set for calculating statistics value is denoted by $s_j$, the width of Gaussian kernel is denoted by $\sigma_j$, the average of illumination patterns of the learning image is denoted by $a_j$, and an input image is denoted by b.

[Equation 1]

$$s = \sum_{j=1}^{J} \omega_j s_j \bigg/ \left( \sum_{j=1}^{J} \omega_j \right) \quad (1)$$

[Equation 2]

$$\omega_j = \exp\left[-\frac{1}{2}(D(b, a_j)/\sigma_j)^2\right] \quad (2)$$

[Equation 3]

$$D(b, a_j) = \|b - a_j\|_2 \quad (3)$$

Next, normal line information estimation section 52 of normal line information estimation device 42 estimates an initial value of a normal line albedo vector considering the reflectance in registered image 20 (S3). The normal line albedo vector means a vector obtained by multiplying the normal line direction vector by its albedo (reflectance).

The image vector can be expressed by the following equation (4) wherein, for example, y(x) denotes a gray value of pixel x, S denotes J pieces of illumination direction vectors (for learning), b(x) denotes a normal line albedo vector of pixel x, and v(x) denotes J pieces of error value vectors of illumination of pixel x.

[Equation 4]

$$y(x) = S^T b(x) + v(x) \quad (4)$$

$$y(x) = \begin{bmatrix} i(x, s_1) \\ i(x, s_2) \\ \vdots \\ i(x, s_{J-1}) \\ i(x, s_J) \end{bmatrix} \quad (5)$$

$$J \times 1$$

$$S = \begin{bmatrix} s_{11} & s_{12} & \cdots & s_{1J} \\ s_{21} & s_{22} & \cdots & s_{2J} \\ s_{31} & s_{32} & \cdots & s_{3J} \end{bmatrix}$$

$$3 \times J$$

$$b(x) = \begin{bmatrix} b_1(x) \\ b_2(x) \\ b_3(x) \end{bmatrix}$$

$$3 \times 1$$

$$v(x) = \begin{bmatrix} e(x, s_1) \\ e(x, s_2) \\ \vdots \\ e(x, s_{J-1}) \\ e(x, s_J) \end{bmatrix}$$

$$J \times 1$$

The initial value of the normal line albedo vector in step S3 can be estimated as normal line albedo vector $b_{MAP}(x)$ obtained by MAP estimation by using illumination direction vector S' estimated in step S2.

$$b_{MAP} = [S\Sigma_v^{-1}S'^T + C_b^{-1}]^{-1}[S\Sigma_v^{-1}(y-\mu_v) + C_b^{-1}\mu_b] \quad \text{[Equation 5]}$$

Next, specular reflection component estimation section 53 of normal line information estimation device 42 calculates a specular reflection component from the initial value of the normal line albedo vector estimated in normal line information estimation section 52 (S4).

Specular reflection component M(x) can be calculated from the illumination direction estimated in step S2 and normal line albedo vector $b_{MAP}(x)$.

$$M(x) = y(x) - Sb_{MAP}(x) = v(x) \quad (7)$$

In equation (7), difference v(x) between actual luminance value y(x) and luminance component $Sb_{MAP}(x)$ calculated from the illumination direction estimated in step S2 and normal line albedo vector $b_{MAP}(x)$ is regarded as specular reflection component M(x). That is to say, since the estimation of specular reflection component M(x) in step S4 is the estimation of the initial value, in order to carry out the processing most rapidly, the operation is carried out by regarding all of error value vectors v(x) as specular reflection component M(x).

In order to carry out precise operation of specular reflection component M(x), in step S4, the estimation can be carried out by using estimation models such as the Phong model or the Torrance-Sparrow model mentioned below.

Furthermore, when an administrator of image collation device 1 visually checks registered image 20 and finds at first glance that registered image 20 includes a certain portion whose luminance is discriminated to be considerably different from that of the other portions, that is, a portion having an extremely high luminance (which is estimated to be a specular reflection component due to the effect of glaze of a face or frame of glasses) or a portion having an extremely low luminance (which is estimated to be a shade component of the high portion such as the nose, a so-called cast-shadow component), each portion may be separated and operation may be carried out by regarding the portion having an extremely high luminance as a specular reflection component and regarding the portion having an extremely low luminance as a cast shadow component. When it is not preferable that such a subjective judgment by an administrator is intervened, for example, the operation may be carried out by extracting only the plus value portions as a specular reflection component and the minus value portions as a cast shadow component among error components v(x). In this exemplary embodiment, the specular reflection component is described as an inhibiting factor with respect to the estimation of normal line information. However, in addition to the specular reflection component or the cast shadow component, a component contained in the error component may be an inhibiting factor with respect to the estimation of normal line information. Similar to the example described by using the specular reflection component, by removing such components that may be an inhibiting factor with respect to estimation of normal line information, estimation can be carried out.

Next, specular reflection component removing section 54 of normal line information estimation device 42 removes specular reflection component M(x) estimated by specular reflection component estimation section 53 in step S4 from gray value y(x) of registered image 20 (step S5).

Then, normal line information estimation section 52 of normal line information estimation device 42 estimates the normal line albedo vector again (S6) by the same method as the method for estimating the initial value of the normal line albedo vector in step S3 from image y'(x) from which specular reflection component M(x) has been removed in step S5.

Next, convergence determination section 55 of normal line information estimation device 42 compares value $b_{MAP}(x)$ of the normal line albedo vector estimated in step S3 with the value of the normal line albedo vector estimated in step S6 and allows normal line information estimation section 52, specular reflection component 53 and specular reflection component removing section 54 to continuously execute the processing from step S4 to step S6 until the values converge (S7).

When convergence determination section 55 allows normal line information estimation section 52, specular reflection component 53 and specular reflection component removing section 54 to execute the processing from step S4 to step S6 repeatedly, it compares the matching degree between the previously estimated normal line albedo vector and the normal line albedo vector estimated at this time. When the matching degree is a threshold value or more, convergence determination section 55 judges that the values converge, determines the value as a value of the normal line albedo vector of registered image 20, and outputs the value to reflection component information calculation section 43 of registered image group formation device 3 (S8). The matching degree at this time may be any one that can express the similarity of two normal line albedo vectors or normal vectors, which can be compared and collated with each other. An example of the matching degree includes the sum of correlation distances between the normal line albedo vectors, the inverse number of the sum of Euclidean distances, the sum of correlation distances of normal line albedo vector that has been converted into a unit vector, or the like.

Furthermore, in step S6, when specular reflection component estimation section 53 estimates a specular reflection component, illumination direction estimation section 41 estimates the illumination direction simultaneously. Thereby, the estimation accuracy of both the illumination direction and the specular reflection component can be improved. The specular reflection component using a reflection model can be described as follows. This is because if the estimation accuracy of the illumination direction can be enhanced, the estimation accuracy of the specular reflection component can be also enhanced simultaneously.

In step S8, a value of the normal line albedo vector of registered image 20 is determined and at the same time, reflection component information calculation section 43 of registered image group formation device 3 determines specular reflection component M(x) and diffuse reflection component I(x) in registered image 20. Specifically, specular reflection component calculation section 61 calculates specular reflection component M(x) and diffuse reflection component calculation section 62 calculates diffuse reflection component I(x).

A case where the calculation of specular reflection component M(x) is carried out in one point or in one pixel is described. By carrying out this processing with respect to all pixels in the entire screen, the specular reflection components of the entire screen can be calculated.

For example, in the Phong model, specular reflection term $I_s$ can be calculated by using the following equation (8).

$$I_s = I_L r_s (p^T m)^q \tag{8}$$

In the equation, m represents the following equation.

$$m^T n = -l^T n, m^T (l \times n) = 0 \tag{9}$$

In the equation, $I_L$ denotes the intensity of incident light, $r_s$ denotes a mirror reflectance, q denotes a parameter showing the surface smoothness, n denotes a normal line direction unit vector, l denotes an incident light direction unit vector, p denotes an eye direction unit vector, m exists on the same plane of l and n and denotes a unit vector expressing the direction in which the incident angle is equal to the reflection angle.

Besides, the Torrance-Sparrow model can be used.

$$I_s = I_L r_s \exp\{-((\cos^{-1}(p^T m)^2/\sigma^2)\} \tag{10}$$

In equation (10), $\sigma$ is a parameter showing the surface smoothness and other parameters are the same as those described in the Phong model.

Note here that the present invention is not limited to the calculation method of the specular reflection component described herein and can appropriately employ widely known methods. For example, as to various methods of calculating a specular reflection component including the above-mentioned models, the method described in a document titled "Three-dimensional CG from Photographs" by Gang Xu, Kindai Kagakusha, 2001, p. 95-96 can be used.

Next, diffuse reflection component I(x) is calculated from the following equation (11), $$I = BS \tag{11}$$

Herein, I denotes image data (N pixel×c number of input images); B denotes a matrix including the normal line direction and reflectance of an object (N×3); and S denotes a matrix including the direction of a light source and intensity (3×c). Pretreatment using registered image 20 of the object is completed by the processing described above.

Next, reflection component information calculation section 43 of registered image group formation device 3 receives the input of a plurality of illumination directions from illumination direction input section 44 (S10) and calculates specular reflection component M(x) and diffuse reflection component I(x) corresponding to the illumination directions (S11). Specifically, specular reflection component calculation section 61 calculates specular reflection component M(x), and diffuse reflection component calculation section 62 calculates diffuse reflection component I(x).

As one example of the illumination directions, an angle up to 60° at intervals of 20° in the left-right and up-down directions can be selected when the front direction of a face is defined as an angle of 0° in the left-right direction and 0° in the up-down direction. In this case, an example of the angle includes seven angles, i.e., −60°, −40°, −20°, 0°, 20°, 40°, and 60°. Thus, 49 (7×7) kinds of illumination directions can be obtained in the up-down and left-right directions. Note here that the angle is not necessarily provided at equal intervals. The angle, which can exhibit an appropriate effect, may be selected in accordance with the purpose and application of use.

Figure 6:
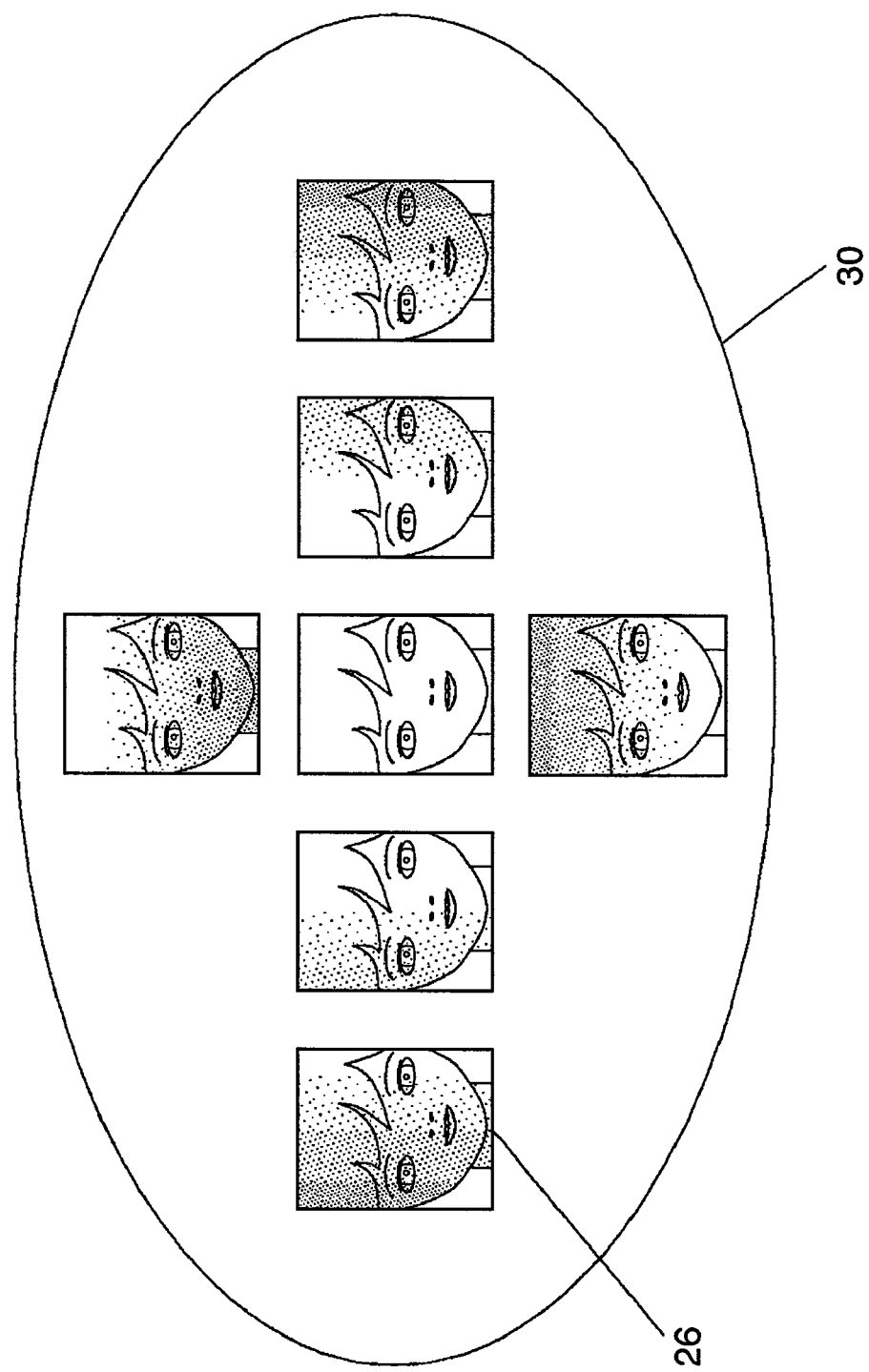
FIG. 6 conceptually shows an example of a registered image group in accordance with the first exemplary embodiment of the present invention.

Then, in step S11, when image synthesizing section 45 adds specular reflection component M(x) and diffuse reflection component I(x), which are calculated in reflection component information calculation section 43, corresponding to the predetermined angle, a group including a plurality of registered images of an object corresponding to the predetermined illumination directions that are different from each other can be obtained (S12). Such processing is carried out with respect to each of the plurality of illumination directions input from illumination direction input section 44 (S13), and thereby, registered image group 30 can be formed. FIG. 6 conceptually shows an example of registered image group 30 in accordance with the first exemplary embodiment of the present invention. In the first exemplary embodiment of the present invention, an example in which previously determined illumination directions are input from illumination direction input section 44 is shown. However, the present invention is not limited to this configuration and may be a configuration in which, for example, an administrator inputs arbitrary illumination directions from illumination direction input section 44.

As shown in FIG. 1 or 2, in image collation device 1 in accordance with the first exemplary embodiment of the present invention, registered image group 30 formed by registered image group formation device 3 is stored in registered image group storing section 4. To this processing, a preparation for collation in image collation device 1 in accordance with the first exemplary embodiment of the present invention is completed.

Figure 7:
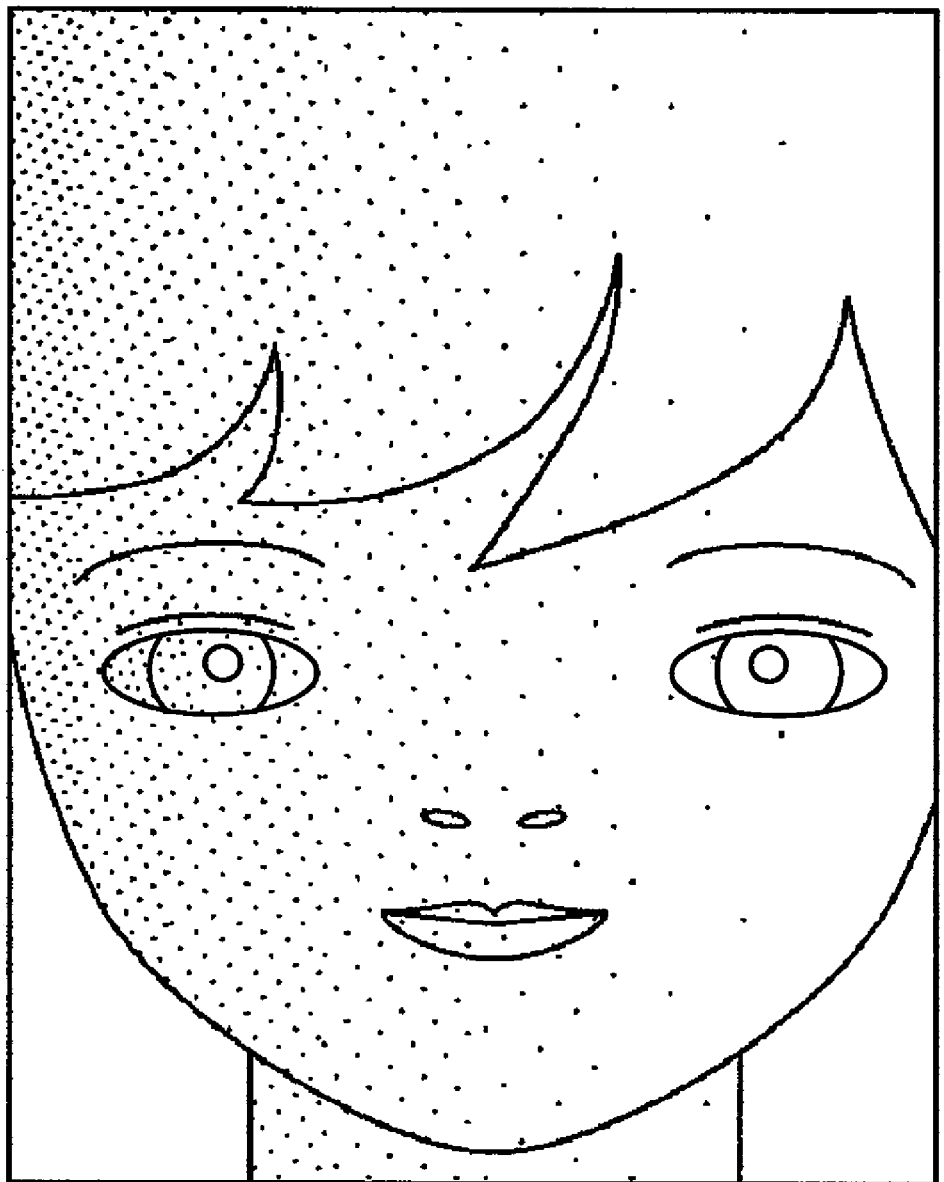
FIG. 7 conceptually shows an example of a comparative image in the exemplary embodiment of the present invention.

In image collation device 1 in accordance with the first exemplary embodiment of the present invention, when comparative image 25 of a person to be authenticated is input from comparative image input section 5, comparative image 25 is transmitted from comparative image input section 5 to comparison and collation section 8. In comparison and collation section 8, comparative image 25 and registered image group 30 are compared and collated with each other. The results are output from output section 9. FIG. 7 conceptually shows an example of comparative image 25 in the exemplary embodiment of the present invention.

As mentioned above, in image collation device 1 in accordance with the first exemplary embodiment of the present invention, specular reflection component M(x) is calculated from the image of the object and specular reflection component M(x) is removed, and thereafter, the estimation of the normal line albedo vector is carried out. Therefore, it is possible to estimate a normal line albedo vector free from adverse effect of specular reflection component M(x) (for example, the effect of glaze caused by specular reflection of illumination when sebum comes to the surface of the face). Thus, a normal line albedo vector that is close to the actual object can be output. Consequently, also in the case where registered image group 30 is formed in the plurality of assumed illumination directions by using the normal line albedo vectors estimated by image collation device 1 in accordance with the first exemplary embodiment of the present invention, more realistic and accurate registered image group 30 can be obtained.

For example, when the case where collation with respect to comparative image 25 is carried out by using image collation device 1 in accordance with the first exemplary embodiment of the present invention is compared with that of the conventional image collation device, the first place collation rate can be improved. Note here that the first place collation rate means a rate at which a registered image in which the same object as a comparative image is photographed is authenticated in the first place. It is shown that the higher the rate is, the more accurately the authentication can be carried out.

Second Exemplary Embodiment

Figure 8:
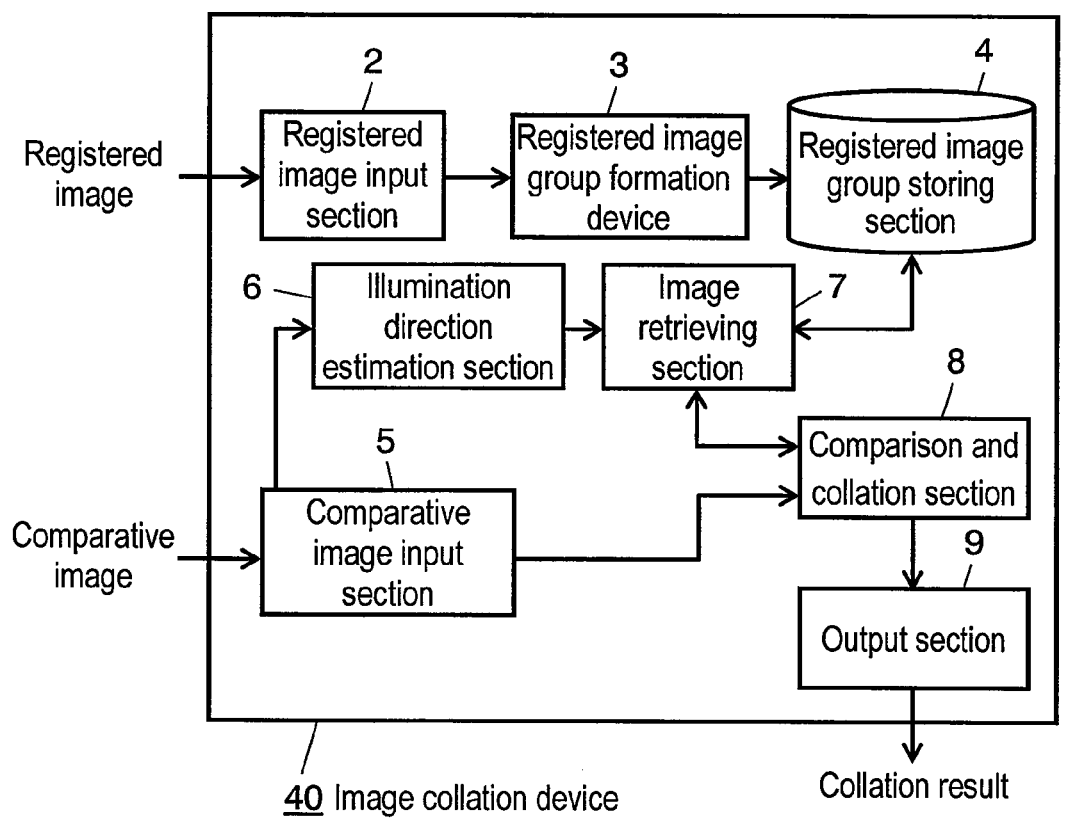
FIG. 8 is a block diagram showing an image collation device in accordance with a second exemplary embodiment of the present invention.

Next, image collation device 40 in accordance with a second exemplary embodiment of the present invention is described. FIG. 8 is a block diagram showing a configuration of image collation device 40 in accordance with the second exemplary embodiment of the present invention.

As shown in FIG. 8, as compared with image collation device 1 of the above-mentioned first exemplary embodiment, image collation device 40 in accordance with the second exemplary embodiment of the present invention includes illumination direction estimation section 6 for estimating the illumination direction from a comparative image input from comparative image input section 5; and image retrieving section 7 for transmitting information of the illumination direction estimated in illumination direction estimation section 6 to registered image group storing section 4, retrieving and extracting the registered image corresponding to the illumination direction matched to the illumination direction of the above-mentioned comparative image from registered image group 30 stored in registered image group storing section 4, and outputting it to comparison and collation section 8.

The functions of the other configuration, that is, registered image input section 2, registered image group formation device 3, registered image group storing section 4, comparative image input section 5, comparison and collation section 8 and output section 9 are the same as the functions of the components of image collation device 1 in the first exemplary embodiment, and therefore, the description thereof is omitted herein.

With such a configuration, image collation device 40 in accordance with the second exemplary embodiment of the present invention further includes functions of estimating the illumination direction from comparative image 25 by illumination direction estimation section 6, retrieving the registered image corresponding to the illumination directions estimated by illumination direction estimation section 6 from registered image group 30 stored in registered image group storing section 4, and transmitting it to comparison and collation section 8, in addition to the effect exhibited by image collation device 1 of the first exemplary embodiment. For example, when comparative image 25 described in the first exemplary embodiment is input, registered image 26 corresponding to the illumination direction is transmitted from registered image group storing section 4 to comparison and collation section 8 by image retrieving section 7.

Therefore, it is possible to realize a configuration suitable for a small device capable of reducing the number of times of comparison and collation processing in comparison and collation section 8, and reducing operation load to CPU, and the like.

Third Exemplary Embodiment

Figure 9:
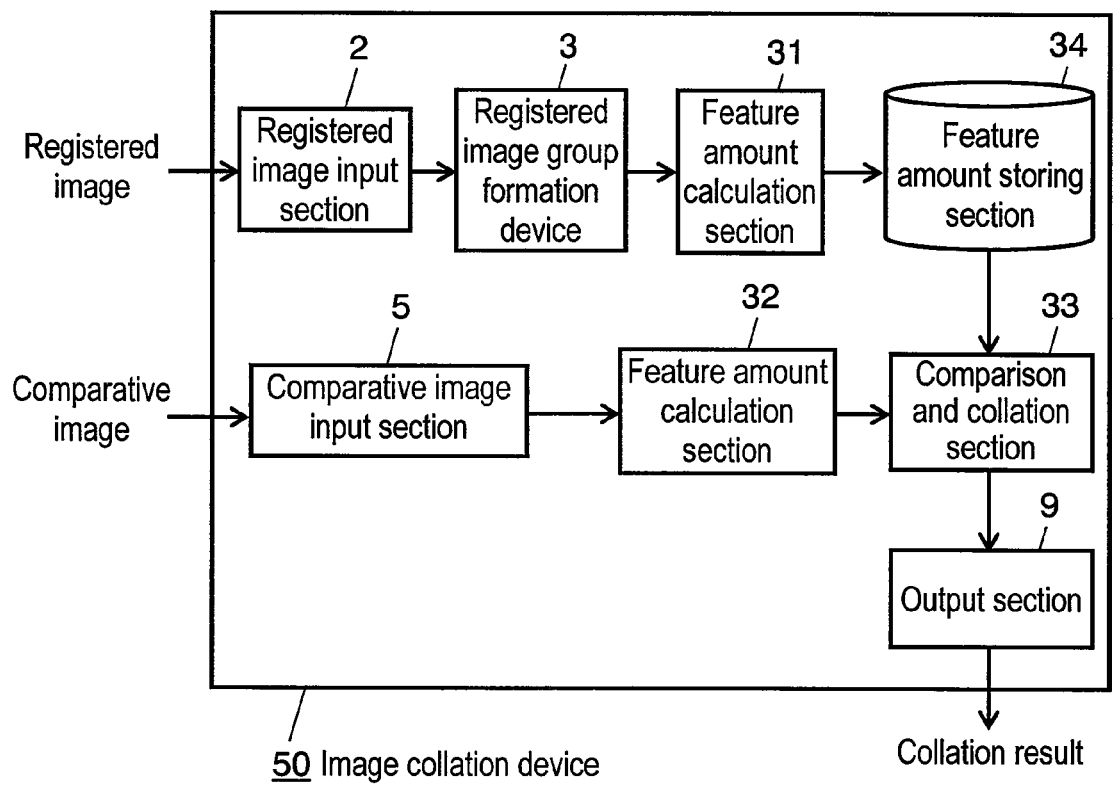
FIG. 9 is a block diagram showing an image collation device in accordance with a third exemplary embodiment of the present invention.

Next, image collation device 50 in accordance with a third exemplary embodiment of the present invention is described. FIG. 9 is a block diagram showing a configuration of image collation device 50 in accordance with the third exemplary embodiment of the present invention.

As shown in FIG. 9, image collation device 50 in the third exemplary embodiment of the present invention is different from image collation device 1 of the above-mentioned first exemplary embodiment in that image collation device 50 includes feature amount calculation section 31 for calculating a feature amount from a comparative image input from comparative image input section 5 and feature amount calculation section 32 for calculating a feature amount of each registered image from a registered image formed in registered image group formation device 3.

Herein, an example of a method for calculating the feature amount from images in feature amount calculation section 31 and feature amount calculation section 32 includes a graph matching method in which a pattern called a graph is disposed on a point expressing a face feature so as to find accurate feature points of the face, and feature amount of each point is compared and collated with registered data, and Gabor wavelet transform that is a technique used for signal analysis and image compression, in which the wavelet waveform is used so as to take only features of the waveform (frequency component, etc.) from a subject to be transformed. The calculation method of the present invention is not particularly limited to the above method.

Furthermore, image collation device 50 of the third exemplary embodiment of the present invention includes, instead of registered image group storing section 4 of image collation device 1 in the first exemplary embodiment, feature amount storing section 34 for storing the feature amount calculated from the registered image group by feature amount calculation section 31.

Furthermore, image collation device 50 in accordance with the third exemplary embodiment of the present invention includes, instead of comparison and collation section 8 of image collation device 1 in the first exemplary embodiment, comparison and collation section 33 for comparing and collating the feature amount calculated from comparative image by feature amount calculation section 32 and the feature amount of the registered image group stored in feature amount storing section 34.

The functions of the other configuration, that is, registered image input section 2, registered image group formation device 3, comparative image input section 5, and output section 9 are the same as those of image collation device 1 in the first exemplary embodiment, and therefore the description thereof is omitted herein.

With such a configuration, in addition to the effect exhibited by image collation device 1 in the first exemplary embodiment, image collation device 50 in accordance with the third exemplary embodiment of the present invention has further the following advantage. As compared with the configuration for storing the image information itself of registered image group storing section 4, necessary storing capacity can be reduced because feature amount storing section 34 stores data of the feature amount calculated by feature amount calculation section 31.

Furthermore, in addition to the effect exhibited by image collation device 1 of the first exemplary embodiment, image collation device 50 of the third exemplary embodiment of the present invention has the following advantage. Comparison and collation section 33 compares and collates the feature amounts output from feature amount storing section 34 and feature amount calculation section 32, respectively. Therefore, as compared with a configuration for matching the entire image, operation processing in comparison and collation section 33 is small. Thus, a configuration suitable for a small device capable of reducing operation load to CPU, and the like, can be realized.

INDUSTRIAL APPLICABILITY

A normal line information estimation device, a registered image group formation device and an image collation device, as well as a normal line information estimation method and a program in accordance with the present invention have an effect of providing an image collation device capable of forming a registered image group that matches actual images and having a high authentication rate. Therefore, they are useful as a normal line information estimation device, a registered image group formation device and an image collation device as well as a normal line information estimation method and program and the like used for image collation.

The invention claimed is:

1. A normal line information estimation device for estimating normal line information of an object from an image of the object, comprising:

an illumination direction estimation section for estimating an illumination direction with respect to the object in the image from a luminance value of the image;

a normal line information estimation section including a processor programmed to estimate the normal line information of the object in the image based on the illumination direction;

a specular reflection component estimation section for estimating a specular reflection component of the image from the normal line information of the object and the illumination direction with respect to the object; and a specular reflection component removing section for removing the specular reflection component from the image, wherein the normal line information estimation section estimates normal line information again from the image from which the specular reflection component has been removed in the specular reflection component removing section.

2. The normal line information estimation device of claim 1, further comprising a convergence determination section for comparing a value of the normal line information estimated in the normal line information estimation section before the specular reflection component is removed with a value of the normal line information estimated in the normal line information estimation section after the specular reflection component is removed, and determining whether the values of the normal line information converge, wherein the value of the normal line information, which has been determined to converge in the convergence determination section, is output.

3. The normal line information estimation device of claim 1, wherein the illumination direction estimation section estimates the illumination direction of the object again from the image from which the specular reflection component has been removed in the specular reflection component removing section; and the normal line information estimation section estimates the normal line information again from the image from which the specular reflection component has been removed by using the illumination direction estimated again in the illumination direction estimation section.

4. A registered image group formation device, comprising:

a normal line information estimation device of claim 1;

a registered image input section for inputting a registered image to be registered into the normal line information estimation device;

an illumination direction input section to which a plurality of different illumination directions are input;

a specular reflection component calculation section for calculating a specular reflection component of the object in the plurality of different illumination directions based on the normal line information corresponding to the registered image output from the normal line information estimation device;

a diffuse reflection component calculation section for calculating a diffuse reflection component of the object in the plurality of different illumination directions based on the normal line information corresponding to the registered image output from the normal line information estimation device; and an image synthesizing section for adding the specular reflection component and the diffuse reflection component so as to form a registered image group in the plurality of different illumination directions.

5. An image collation device, comprising:
a registered image group formation device of claim 4;
a registered image group storing section for storing a registered image group formed by the registered image group formation device;
a comparative image input section for inputting a comparative image to be compared;
a comparison and collation section for comparing and collating the comparative image input from the comparative image input section with the registered image group stored in the registered image group storing section.

6. The image collation device of claim 5, comprising:
a comparative image illumination direction estimation section for estimating an illumination direction in the comparative image input by the comparative image input section; and
an image retrieving section for retrieving a registered image in the illumination direction estimated in the comparative image illumination direction estimation section from the registered image group storing section;
wherein the comparison and collation section collates the registered image retrieved by the image retrieving section with the comparative image.

7. The image collation device of claim 5, comprising:
a first feature amount calculation section for calculating a feature amount of the registered image group formed in the registered image group formation device; and
a second feature amount calculation section for calculating a feature amount of the comparative image input by the comparative image input section; wherein
the registered image group storing section stores the feature amount of the registered image group, and
the comparison and collation section compares and collates the registered image group with the comparative image in terms of the feature amount.

8. A normal line information estimation method for estimating normal line information of an object from an image of the object, the method comprising:
(i) estimating an illumination direction with respect to the object in the image from a luminance value of the image;
(ii) estimating, using a processor, normal line information of the object in the image based on the illumination direction;
(iii) estimating a specular reflection component of the image from the normal line information of the object and the illumination direction with respect to the object;
(iv) removing the specular reflection component from the image; and
(v) estimating, using the processor, normal line information again from the image from which the specular reflection component has been removed in step (iv).

* * * * *